United States Patent

Busch et al.

[15] 3,689,586
[45] Sept. 5, 1972

[54] PROCESS FOR SMOOTH OPERATION OF BURNER IN PRODUCTION OF ACETYLENE-CONTAINING GAS

[72] Inventors: Bernhard Busch, 4 Neubergstrasse, Gerolsheim upper Palaline; Hans Funk, 12 Friesenstrasse, Ludwigschafen/Rhein; Walter Teltschik, 12 Wildstrasse, Frankenthal/Upper Palaline, all of Germany

[22] Filed: Sept. 28, 1970

[21] Appl. No.: 76,049

Related U.S. Application Data

[62] Division of Ser. No. 742,459, July 3, 1968, abandoned.

[52] U.S. Cl. ............................260/679 R, 23/277
[51] Int. Cl. .......................................C07c 11/24
[58] Field of Search ................260/679; 23/277, 252

[56] References Cited

UNITED STATES PATENTS

| | | | |
|---|---|---|---|
| 3,246,957 | 4/1966 | Fauser | 23/277 |
| 3,460,915 | 8/1969 | Lehrer et al. | 23/277 |
| 3,254,964 | 6/1966 | Lehrer et al. | 23/277 |
| 3,438,741 | 4/1969 | Boyd et al. | 23/277 |

*Primary Examiner*—Delbert E. Gantz
*Assistant Examiner*—J. Nelson
*Attorney*—Johnston, Root, O'Keeffe, Keil, Thompson and Shurtleff

[57] ABSTRACT

Process for maintaining the smooth operation of an acetylene burner in the production of an acetylene-containing gas, said burner having a mixing chamber and a combustion chamber separated by a ceramic gas distribution block with parallel passages, by providing a metal plate with passages aligned with said parallel passages as a cover for the upstream face of the ceramic block to prevent spalling thereof caused by premature ignitions in the mixing chamber and triggering of further premature reactions by ceramic fragments.

3 Claims, 1 Drawing Figure

PATENTED SEP 5 1972  3,689,586
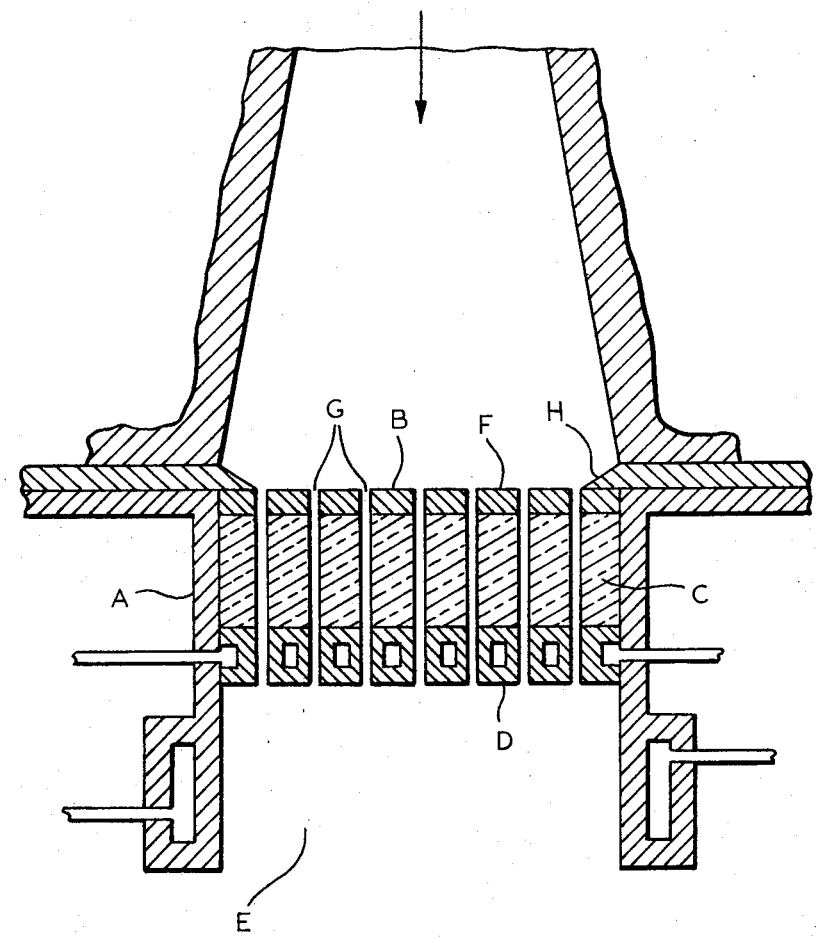
INVENTORS
BERNHARD BUSCH
HANS FUNK
WALTER TELTSCHIK
BY Johnston, Root,
O'Keeffe, Keil, Thompson & Shurtleff
ATTORNEYS

PROCESS FOR SMOOTH OPERATION OF BURNER IN PRODUCTION OF ACETYLENE-CONTAINING GAS

RELATED APPLICATION

This application is a division of our copending application, Ser. No. 742,459, filed July 3, 1968 now abandoned.

INTRODUCTION

It is known that acetylene can be produced by the partial oxidation of hydrocarbons with oxygen, the hydrocarbon and the oxygen being heated in separate preheaters and mixed at high speed in a mixing chamber and the mixture being introduced through a gas distributor into a reaction chamber wherein a flame reaction produces an acetylene-containing cracked gas. At the end of the reaction chamber the hot flame gases are quenched with a quenching liquid.

It has also been proposed to provide a gas distributor in the form of a block containing a plurality of parallel channels. The velocity of the gas mixture is raised in these channels sufficiently to prevent the flame from flashing back through the channels into the mixer. The channels may contain obstructions such as perforated plates, which offer additional resistance to the flowing gas mixture.

The temperature of the gas mixture entering the block may be as high as 650° C., depending upon the nature of the hydrocarbon used, whereas the temperature in the reaction chamber is about 1,500° C. At these temperatures the production of the gas distributor block from ceramic material naturally suggests itself. However, the life of distributor blocks made of such material is very short. In view of this fact it has been proposed to make only the upper part of the gas distributor block of ceramic material and the bottom part of metal, principally iron, and to provide this lower metal part with cavities for the passage therethrough of water for cooling. Water-cooled metal is also used for the construction of the reaction chamber which adjoins the gas distributor. The reduction in temperature which the gas mixture experienced on its way through such a short water-cooled zone in the block is very slight. Moreover, there is no risk of condensation and of a consequent reduction in yield when condensable hydrocarbons, such as light naphtha, are reacted.

However, when the size of the burner unit is increased it is found that the higher stresses which are due to occasional premature reactions in the mixing chamber damage the surface of those parts of the gas distributor block which consist of ceramic material. This leads to spalling and the small fragments that break away may trigger off further premature reactions which impair the smooth operation of the burners. Furthermore, some hydrocarbons, such as light naphtha, always contain minor quantities of sulfur which attacks the ceramic structure and accelerates the process of deterioration.

It has therefore already been proposed to make also the upper part of the gas distributor block of metal and to cool the same. However, this causes a considerable heat loss which interferes with the development of the reaction flame, particularly when light naphtha is used, and substantially reduces the reaction yield.

THE INVENTION

It has now been found that, contrary to the present generally accepted view, it is in fact feasible effectively to protect the surface of the ceramic material of a gas distributor block on the side facing the incoming gas and thereby to overcome the above-described difficulties, by covering this surface with a non-scaling metal plate, for instance a plate of chrome-nickel steel, so the open cross sections of the channels or passages in the gas distributor block register with corresponding openings or passages in the metal plate. A plate of this kind, which may be between 2 and 20 mm thick, may be held in position at its peripheral edge by an annular ring. The proposed arrangement is sufficiently flexible to prevent deformation of the plate, since the latter, which bears flush on the ceramic material and which is prevented by the annular ring from lifting away, is capable of yielding in the horizontal direction to the slight thermal expansion that occurs. The proposed arrangement permits large burners to operate satisfactorily even if sulfur-containing hydrocarbons are used. An embodiment of the proposed arrangement is schematically shown in the drawings.

Part C on the side B facing the incoming gas of a gas distributor block A consists of ceramic material, whereas part D (a metal indirect heat exchange plate) which adjoins the reaction chamber E is made of metal. On the side facing the incoming gas it is covered by a plate F of non-scaling metal. The plate is provided with openings or passages G which register with the open cross sections of the channels or passages in the gas distributor block. The plate F is held in position by an annular ring H.

EXAMPLE

In a preheater 6,000 kg of light naphtha were evaporated per hour and heated to 350° C. In a second preheater 4,300 m³ (S.T.P.) per hour of oxygen were heated to 300° C. The hot light naphtha vapor and the hot oxygen were mixed at high speed and the mixture introduced through a gas distributor block into a reaction chamber for the production therein by a flame reaction of an acetylene-containing cracked gas.

The upper part of the gas distributor block consisted of ceramic material. The first time a premature reaction occurred this material spalled and the fragments triggered off further premature reactions which prevented the burner from operating smoothly. The burner had to be shut down after a few days' operation and the gas distributor block had to be repaired.

However, when the gas distributor block had been covered on the side facing the incoming gas with a metal plate, as proposed by the present invention, occasional premature reactions had no adverse consequence. A gas distributor block thus modified will last for several years under the same operating conditions.

The invention is hereby claimed as follows:

1. A process for the production of an acetylene containing gas by the flame reaction of a hydrocarbon vapor and oxygen wherein the hydrocarbon vapor and oxygen are mixed in an upstream mixing chamber of a burner and are reacted in a flame reaction in a downstream combustion chamber of said burner, said chambers being separated by a gas distribution block, the upper part of the gas distribution block consisting of ceramic material containing parallel passages for flow of mixed hydrocarbon vapor and oxygen from said mixing chamber into said combustion chamber and wherein the hydrocarbon vapor and oxygen may occasionally prematurely react in said mixing chamber, the improvement comprising maintaining the smooth operation of said burner by providing a metal plate lying flush on the upper peripheral surface of the ceramic material with passages in said plate aligned with said parallel passages and over the upstream face of said gas distribution block to prevent spalling of the ceramic material as a result of said premature reactions in said mixing chamber and the triggering of further premature reactions in said mixing chamber by spalled fragments of said ceramic material, and holding said metal plate against said upstream face by an annular ring pressing only on the upper peripheral surface of said plate to permit said plate to expand in the horizontal direction as it becomes heated.

2. A process as claimed in claim 1 wherein said hydrocarbon vapor is naphtha.

3. A process as claimed in claim 1, and colling the downstream portion of said distributor block by indirect heat exchange in a metal downstream portion of said block.

* * * * *

PO-1050
(5/69)

UNITED STATES PATENT OFFICE
CERTIFICATE OF CORRECTION

Patent No. 3,689,586          Dated September 5, 1972

Inventor(s) Berhard Busch et al

It is certified that error appears in the above-identified patent and that said Letters Patent are hereby corrected as shown below:

Cover page, left hand column, insert -- [73] ASSIGNEE: Badische Anilin-& Soda Fabrik Aktiengesellschaft, Ludwigshafen am Rhein, Germany --

Signed and sealed this 17th day of April 1973.

(SEAL)
Attest:

EDWARD M. FLETCHER, JR.          ROBERT GOTTSCHALK
Attesting Officer                 Commissioner of Patents